United States Patent [19]

Yoshino

[11] Patent Number: 5,130,939
[45] Date of Patent: Jul. 14, 1992

[54] COMPACT ELECTRONIC CALCULATOR CAPABLE OF DISPLAYING MATRIX ELEMENT DATA UNDER ACTUAL MATRIX FORM

[75] Inventor: Hiroyuki Yoshino, Fussa, Japan

[73] Assignee: Casio Computer Co., Ltd., Tokyo, Japan

[21] Appl. No.: 629,489

[22] Filed: Dec. 18, 1990

[30] Foreign Application Priority Data

Dec. 28, 1989 [JP] Japan .......................... 1-152905[U]

[51] Int. Cl.⁵ ................................................ G06F 3/00
[52] U.S. Cl. ................................................ 364/710.01
[58] Field of Search ................ 364/710.01, 710.02, 364/710.03, 710.04, 706

[56] References Cited

U.S. PATENT DOCUMENTS 4,821,228  4/1989  Wickes et al. ...................... 364/706

Primary Examiner—Long T. Nguyen
Attorney, Agent, or Firm—Frishauf, Holtz, Goodman & Woodward

[57] ABSTRACT

A compact electronic calculator to execute a determinant calculation, includes a first display section for displaying a value of a matrix element and a second display section for displaying a plurality of matrix elements. The matrix elements displayed on the second display section may be changed within a range of a matrix size. Numeral data may be inputted to memory portions of a storage unit for storing matrix data, which corresponds to the matrix element, by selecting one of the displayed matrix elements.

11 Claims, 5 Drawing Sheets

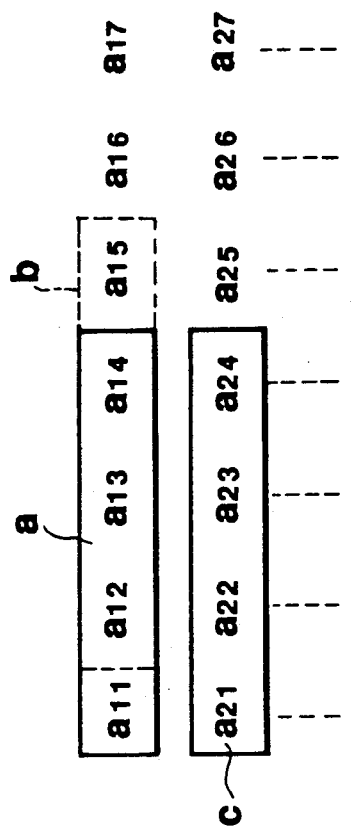
FIG.7A
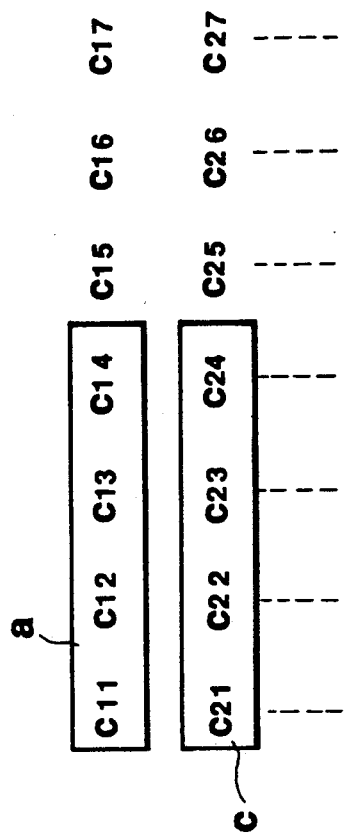
FIG.7B
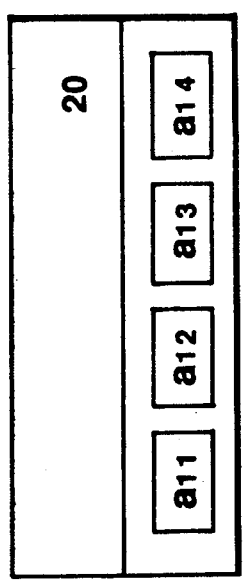
FIG.5
FIG.6

COMPACT ELECTRONIC CALCULATOR CAPABLE OF DISPLAYING MATRIX ELEMENT DATA UNDER ACTUAL MATRIX FORM

BACKGROUND OF THE INVENTION

1. Field of the Invention

The present invention generally relates to a calculator for executing a calculation of determinant, while entering numeral data in an actual matrix form. More specifically, the present invention is directed to a compact electronic calculator capable of inputting/outputting matrix data in a simple manner.

2. Description of the Related Art

In various types of conventional compact matrix calculators to calculate determinant, sizes of display screens in the display units are made rather small. Accordingly, when the number of the matrix elements to constitute the determinant is increased, all of these matrix elements cannot be sometimes displayed at one time on such display screens having small sizes.

Therefore, in accordance with one of these conventional compact matrix calculators, for example, in case of a 3×3 matrix, 9 matrix elements are sequentially displayed in such a coordinate form: $A(1,1)=1$; $A(1,2)=2, \ldots A(3,3)=3$.

However, such a coordinate data entry method has the following problem. That is, it is rather difficult to grasp where each of these matrix elements is relatively positioned at an overall matrix form. Also, the numeral data entry with respect to the respective matrix elements requires rather cumbersome operations, whereby at incorrect numeral data may be mistakenly entered. Moreover, even when the numeral data on the calculation results are read out, the element positions of the readout data may be erroneously grasped in the matrix form by user. Every user has desired an easily operable matrix calculator wherein element positions of the readout data are arranged in a matrix form.

SUMMARY OF THE INVENTION

The present invention has been made in an attempt to solve the above-described problems of the conventional matrix calculator, and therefore has an object to provide a compact electronic calculator capable of readily and simply inputting/outputting matrix elements for constituting determinant.

To achieve the above-described object, a compact electronic calculator, according to the present invention, comprises:

key input means including a matrix designation key for designating a matrix, a numeral entry key for entering numeral data on matrix elements, and a function key for designating one of a plurality of matrix calculations;

input data storage means having a plurality of matrix storage regions, for storing matrix data on the matrix designated by the matrix designation key;

calculation means for performing a determinant calculation by utilizing the matrix data stored in the input data storage means;

display means having a first display section to display one piece of the numeral data related to the matrix elements, and a second display section to display said plurality of matrix elements;

input display control means for controlling the second display section to display a portion of the designated matrix;

selection means for selecting one of the matrix elements displayed on said second display section; and data input control means for inputting the numeral data displayed on the first display unit, into a predetermined position of the input data storage means corresponding to one of the matrix elements which has been selected by the selection means.

BRIEF DESCRIPTION OF THE DRAWINGS

FIGS. 5 and 6 represent display modes; and,

FIGS. 7A and 7B are illustrations for explaining relationships between the matrix data and matrix elements to be displayed.

DETAILED DESCRIPTION OF THE PREFERRED EMBODIMENTS

Overall Arrangement of Electronic Calculator

Referring now to drawings, a preferred embodiment of the present invention will be described.

Figure 1:
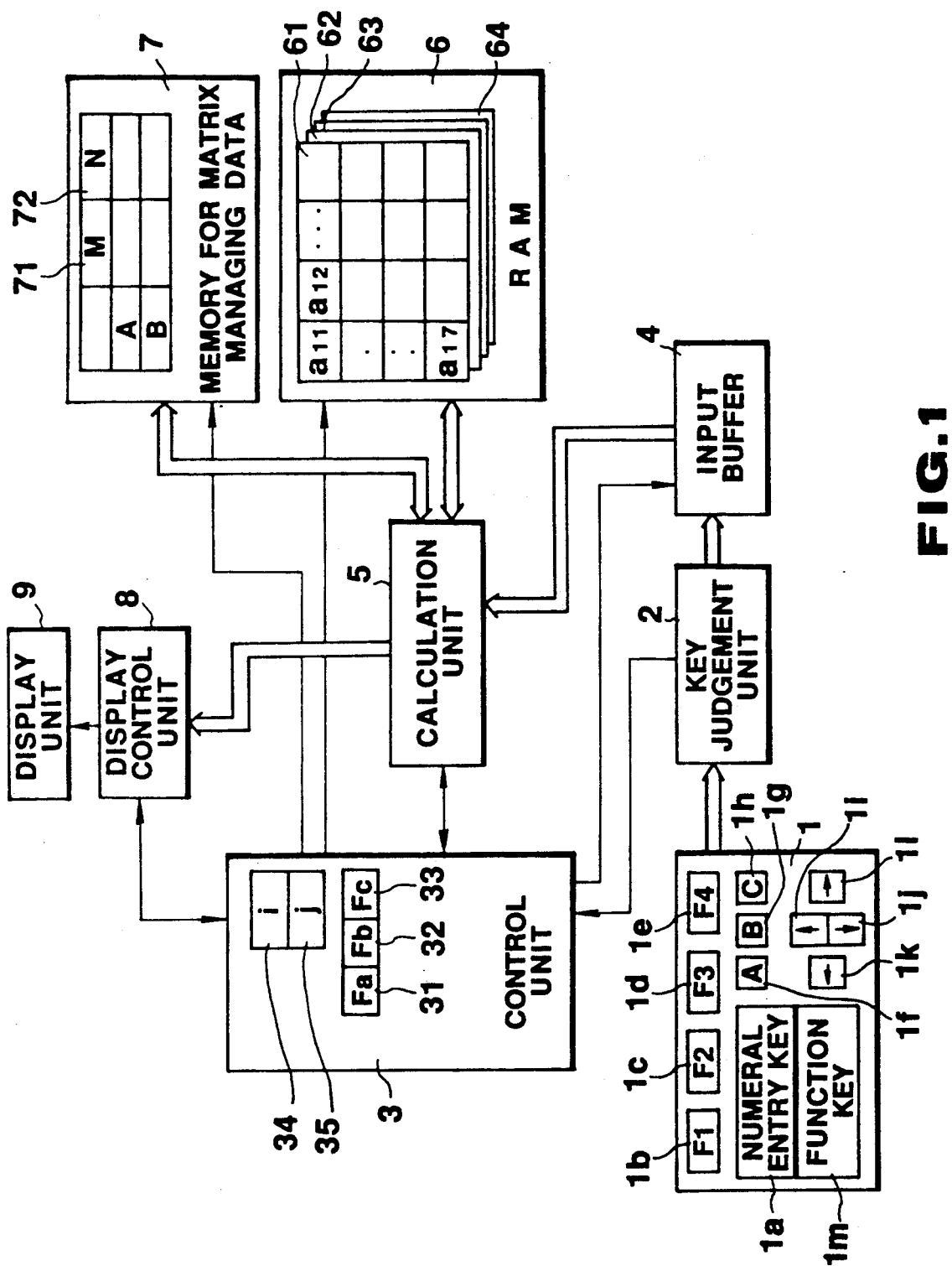
FIG. 1 is a schematic block diagram for representing various functions of a calculator to which the present invention has been applied.

FIG. 1 represents a circuit block diagram of a calculator according to one preferred embodiment of the present invention. In this circuit block diagram, reference numeral 1 denotes a key input unit. This key input unit 1 includes a numeral entry key 1a; a function key 1m; an "F1" key 1b for designating a matrix element; an "F2" key 1c, an "F3" key 1d and an "F4" key 1e which are similarly provided to designate the matrix elements; "A" key 1f, "B" key 1g, and "C" key 1h for designating matrixes "A" and "B" that constitute a matrix, and a matrix "C" as a calculation result; and furthermore " ↑ " key 1i, " ↓ " key 1j, "←" key 1k, and "→" key 1l used to move designation of matrix elements. Thus, data inputted by the key input unit 1 is transferred to a key judgement unit 2. The data by the instruction key is supplied to a control unit 3, and also the input data is furnished to an input buffer 4 depending upon a result of this key judgement unit 2.

The control unit 3 is constructed of ROM (read-only memory) and previously stores therein a program for controlling various circuits. In this preferred embodiment, various control instructions are given to the input buffer 4, a calculation unit 5, a RAM (random access memory) 6, a memory 7 for matrix managing data, and a display control unit 8 from this control unit 3. Also, in response to operations of the above-described "A" key 1f, "B" key 1g, and "C" key 1h, flags "1" are stored into flag memories 31, 32 and 33, which are provided within this control unit 3. The control unit 3 further includes position memories 34 and 35 for storing a position "i" in a row direction of a matrix element and a positioning "j" in a column direction thereof.

The calculation unit 5 executes a calculation of a determinant based upon the input data of the input buffer 4, while transmitting/receiving the data to/from RAM 6 and memory 7 for matrix management data.

In accordance with this preferred embodiment, calculations of addition/substraction/multiplication with respect to the matrixes "A" and "B" are carried out and a calculation result is stored into the matrix "C".

The RAM 6 has at least 4 sets of storage regions for storing matrix element data on 10×10 matrix at maximum. The RAM 6 owns data storage regions 61, 62' 63 corresponding to the matrixes A and B of the determinant and the matrix C of the calculation result, and a data storage region 64 used for calculation processing operation. It should be noted that all of matrix elements have been equal to zero "0" under an initial condition before commencing a calculation.

In the memory 7 for matrix managing data, each preset size (m×n) of the matrixes A and B is stored into a memory area (M) 71 and another memory area (N) 72.

The display control unit 8 has a function to control a display by the display unit 9. The display unit 9 is constructed of two-separated representation as shown in FIG. 5. In the upper display area, numeral data are displayed in a form of 8 segments, whereas character data are displayed in a form of dot matrix in the lower display area.

Determinant Calculation

Figure 2:
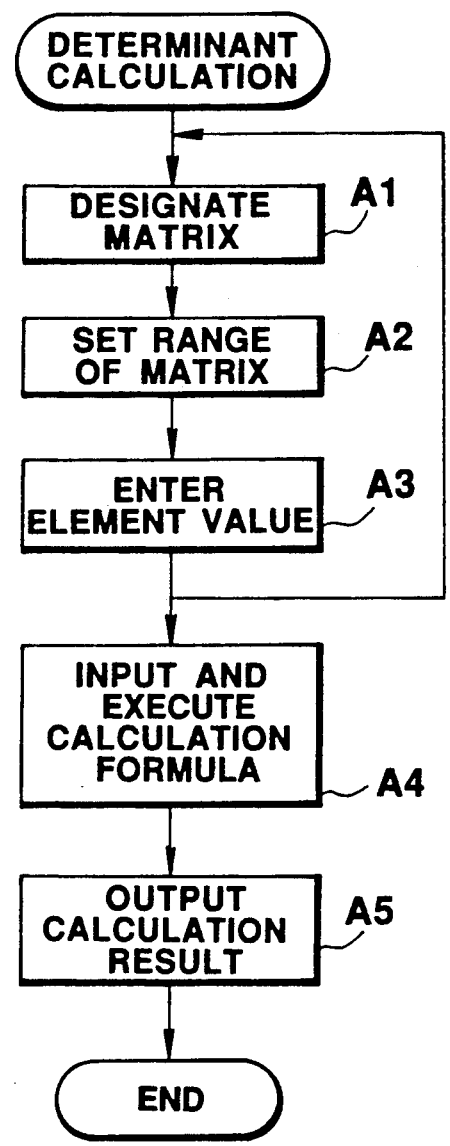
FIG. 2 is a flow chart for explaining an overall operation of a matrix calculation.

Referring now to a flow chart shown in FIG. 2, a determinant calculation will now be described.

At a first step A1, a designation is made to a matrix. In this case, the matrix "A" is first designated by manipulating the "A" key 1f employed in the key input unit 1. Then, the flag "1" is written into the flag memory 31 of the control unit 3, and the values of the matrix elements which are inputted thereafter are entered into the data storage area 61. Subsequently, the calculation process is advanced to a step A2 in which a size or dimension of the designated matrix is set. In this case, the dimension of the matrix is designated by operating the predetermined key to input "7×7". Then, the designation data of m=7 and n=7 are written into the memory areas 71 and 72 respectively, corresponding to the matrix "A" of the memory 7 for matrix managing data.

Thereafter, values of matrix elements corresponding to the matrix "A" are inputted at a step A3. The input operation of these values is executed in accordance with a flow chart shown in FIG. 3.

Figure 3:
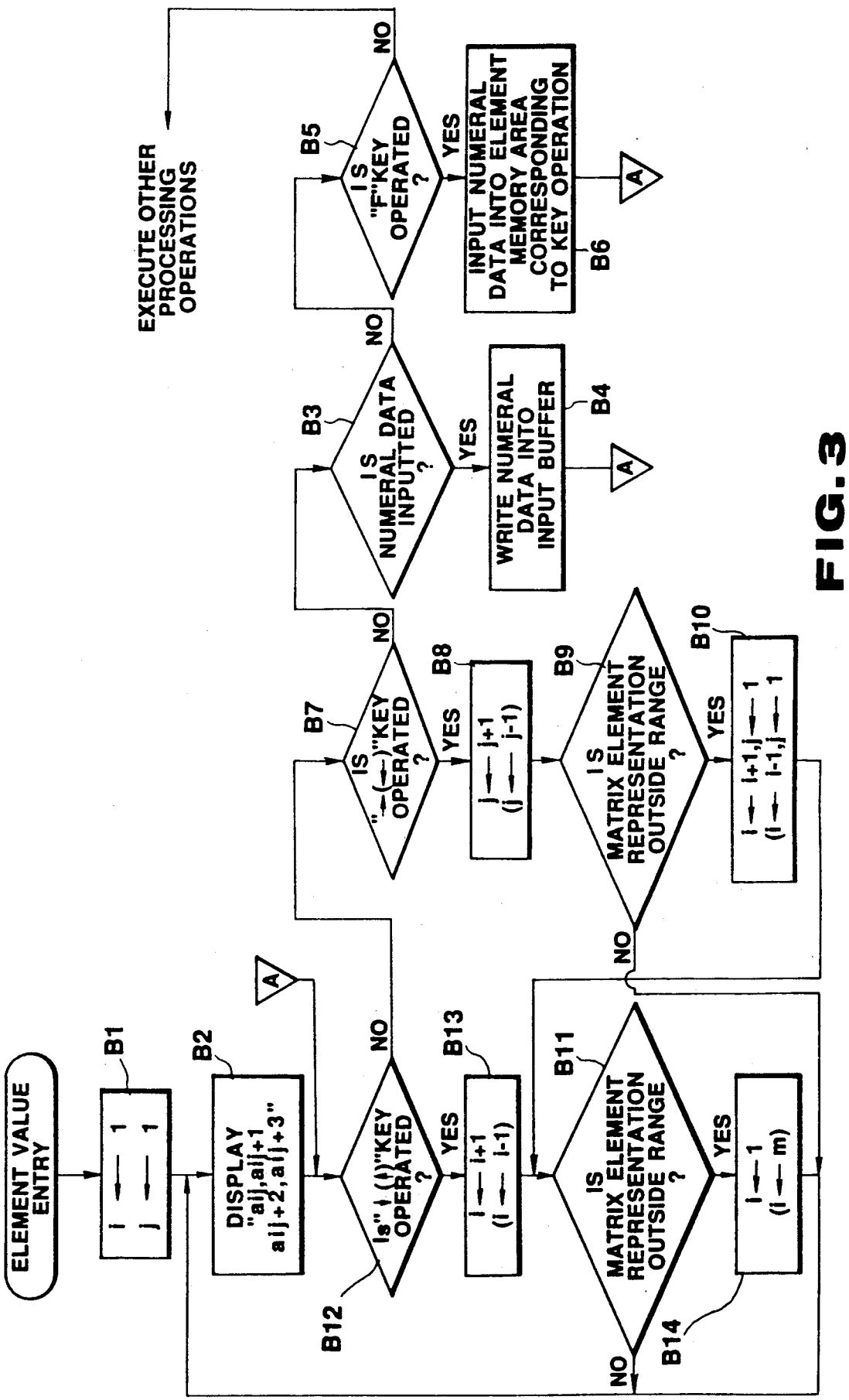
FIG. 3 is a flow chart for explaining input operations of values of matrix elements in the matrix calculation.

In the flow chart of FIG. 3, "1" is written into the position memories 34 and 35 of the control unit 3, respectively, as an initial value at a first step B1.

Next, the process is advanced to a step B2, in which "$a_{ij}$", "$a_{ij+1}$", $a_{ij+2}$", and "$a_{ij+3}$" representative of the matrix elements with respect to the matrix A are displayed on the display section 9. In 7 this case, the matrix elements of $a_{11}$, $a_{12}$, $a_{13}$ and $a_{14}$ shown in the range of FIG. 7A are displayed on the lower portion of the display unit 9 (see FIG. 5). Under such a circumstance, when numeral data is inputted by operating the numeral entry key 1a of the key input unit 1, a judgement result becomes "YES" at the step B3, and then the process is advanced to a step B4, in which the entered numeral data is written into the input buffer 4. Subsequently, when for example, the "F1" key 1b, i.e., the "F" key for designating the matrix elements of the key input unit 1 is operated, a judgement of a step B5 is made "YES" and then the process is advanced to a next step B6. At this step B6, the numeral data is written into the matrix element of "$a_{11}$" corresponding to the "F1" key 1b. In this case, the numeral data is written into the memory area (1,1) of the data storage area 61 corresponding to the matrix "A" of the RAM 6.

Subsequently, while entering other numeral data in a similar method, when the "F2" key 1c, "F3" key 1d, and "F4" key 1e are operated, the numeral data are written into the matrix elements $a_{12}$ and $a_{13}$ and $a_{14}$ corresponding to these keys.

Thereafter, after the numeral data until the matrix element of $a_{14}$ have been written, the "→" key 1l of the key input unit 1 is manipulated. Thus, a judgement result at the step B7 becomes YES and the process is advanced to a step B8. At this step B8, the content of the position memory 35 in the control unit 3 is counted up by "j+1". Next, the process is advanced to a step B9, in which a judgement is made whether or not the representation on the display unit 9 of the matrix element is present outside the range of the matrix "A". If NO, then the process is returned to the previous step B2. At this step B2, other matrix elements of $a_{12}$, $a_{13}$, $a_{14}$ and $a_{15}$ represented in the range "b" of FIG. 7A are displayed on the lower display portion of the display unit 9. As a consequence, when the "F4" key 1e is operated after the numeral data has been inputted under this condition, the numeral data is written into the matrix element of $a_{15}$ corresponding to the "F4" key. Similarly, when the "→" key 1l is operated, the representations of the matrix elements are sequentially scrolled in the left direction. Thereafter, the content of the position memory 35 is counted up by j=8. If the representations of the matrix elements at the display unit 9 are outside the range of matrix "A", a judgement result is made "YES" at the step B9 and the process is advanced to a step B10. At the step B10, the memory content of the position memory 34 in the control unit 3 is counted up by "i+1", and the content of the position memory 35 is set to "j=1". Then, the process is returned through a step B11 to the previous step B2. As a result, the matrix elements of $a_{21}$, $a_{22}$, $a_{23}$ and $a_{24}$ indicated in the range "C" shown in FIG. 7A will now be displayed on the lower display portion of the display unit 9.

Subsequently, when the "→" key 1l is repeatedly operated in a similar manner, the representations of the matrix elements displayed on the display unit 9 are scrolled in the left direction and also are successively line-fed in the lower direction, so that the data entry by the "F" key is performed in conformity with the representations of these matrix elements.

It should be noted that when the matrix element is equal to "0" in this case, no key operation of the "F" key is required by entering the numeral data "0", and therefore both the numeral entry key and "F" key may be operated only when the input other than the value "0" is required for the element.

When the "←" key 1k of the key input unit 1 is operated, the representations of the matrix elements displayed on the display unit 9 are scrolled in the right direction and also sucessivelly line-fed in the upper direction, which is completely opposite to the key operation of the above-described "→" key 1l.

On the other hand, under such a state that the matrix elements of $a_{11}$, $a_{12}$, $a_{13}$ and $a_{14}$ displayed at the range "a" of FIG. 7A are displayed on the display unit 9, in case that the "↓" key 1j of the key input unit 1 is operated, a judgement result at the step B12 becomes YES and then the process is advanced to a step B13. At this step B13, the content of the position memory 34 in the control unit 3 is counted up by "i+1". Then, the process is advanced to a next step B11. A check is made whether or not the representations on the display unit 9 of the matrix elements are outside the range for the matrix "A" at this step B11. If a judgement result becomes "NO", then the process is returned to the previous step B2. As a consequence, the matrix elements of $a_{21}$, $a_{22}$, $a_{23}$ and $a_{24}$ indicated in the range "C" of FIG. 7B are displayed on the display unit 9. Subsequently, when the " ↓ " key 1j is operated in the similar manner, the representations of this matrix elements are successively scrolled in the lower direction. Thereafter, the memory content of the position memory 34 is counted up to "i=8". When the representations of the matrix elements displayed at the display unit 9 are outside the range, a judgement result at the step B11 becomes "YES" and the process is advanced to a step B14. At this step B14, the memory content of the position memory 34 employed in the control unit 3 is set to "i=1". Thereafter, the process is returned to the step B2. As a consequence, the matrix elements of $a_{11}$, $a_{12}$, $a_{13}$ and $a_{14}$ indicated in the range "a" of FIG. 7A are displayed on the lower display portion of the display unit 9.

Subsequently, when the key operation of the " ↓ " key 1j is repeated in the similar manner, the representations of the matrix elements displayed on the display unit 9 are scrolled and therefore, the data entry is carried out by operating the "F" key in accordance with these representations of the matrix elements.

It should be understood that when the " ↑ " key 1i employed in the key input unit 1 is operated, the representations of the matrix elements displayed on the display unit 9 are scrolled in the upper direction of the display screen, which is completely opposite to that of the key operation of the " ↓ " key 1j.

As previously described, when the matrix element data with respect to the matrix "A" have been inputted at the step A3 shown in FIG. 3, the matrix calculation process is returned to the first step A1 in which values of matrix elements with regard to another matrix "B" will now be entered in the similar manners. Then, the matrix element data on this matrix "B" are written into the memory area of the data storage unit 62 in the RAM 6.

Next, the matrix calculation process is advanced to a step A4, at which a calculation formula is entered so as to be executed. In this case, for instance, "A", "+" and "B" are inputted by employing the "A" key 1f, "B" key 1g and function key 1m of the key input unit 1, and subsequently an "E X E" key (not shown in detail) is operated. Accordingly, this calculation process is advanced to a step A5, at which a matrix calculation is executed in the calculation unit 5. A calculation result will be written into the memory area of the data storage area 63 in the RAM 6.

Output of Calculation Results

Figure 4:
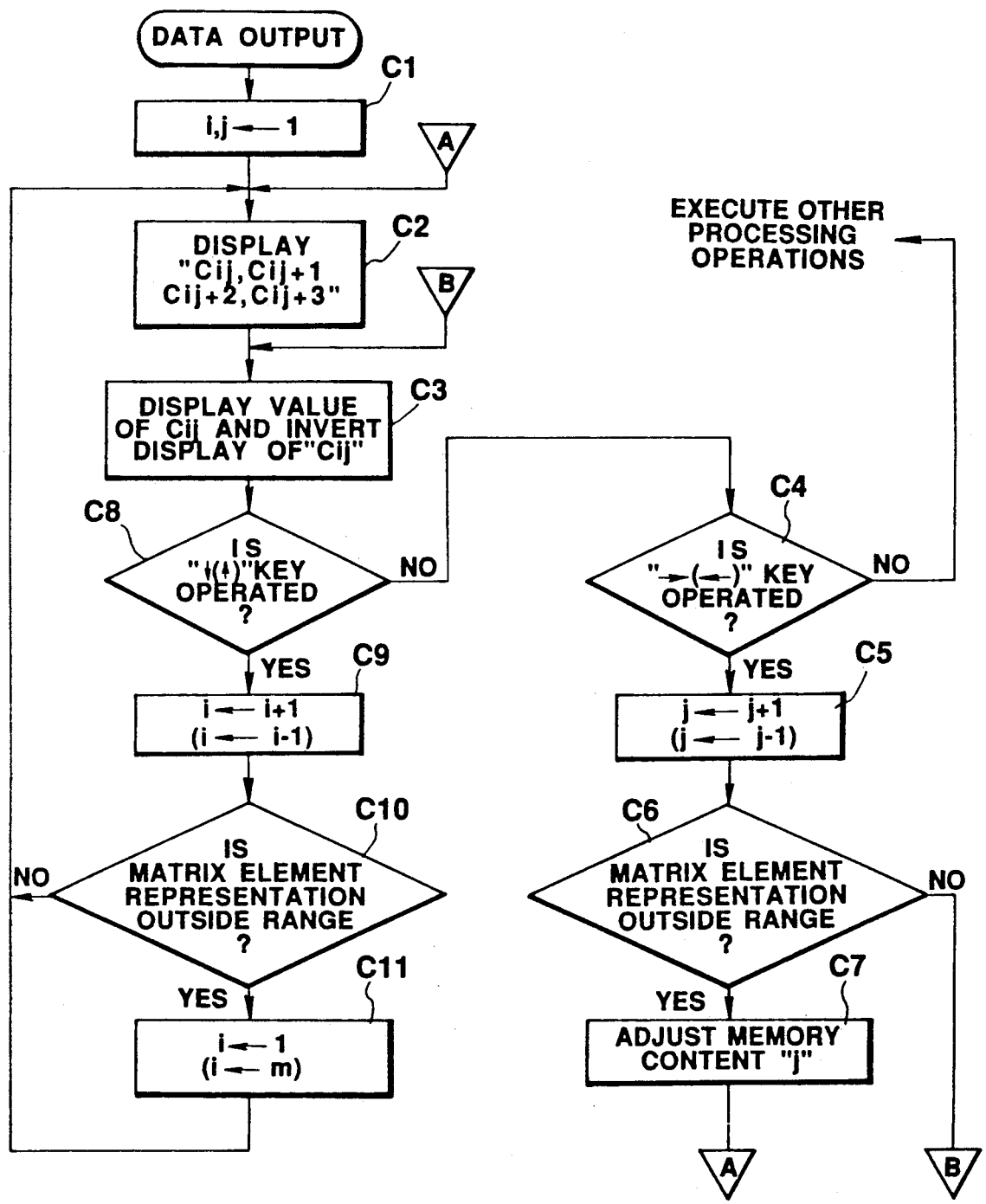
FIG. 4 is a flow chart for explaining output operations of calculation results in the matrix calculation.

Next, the data output operation performed after the matrix calculation has been accomplished is executed in accordance with a flow chart shown in FIG. 4. When the above-described calculation has been completed, a flag FC3 of the control unit 3 is set, and then "i=1" and "j=1" are written into the position memories 34 and 35 in the control unit 3 at a step C1 of the flow chart shown in FIG. 4. Thereafter, the output process is advanced to a step C2 at which "$c_{ij}$", "$c_{ij+1}$", "$c_{ij+2}$" and "$c_{ij+3}$" representative at a memory area of a matrix "c" are displayed on the display unit 9. In this case, matrix elements of $c_{11}$, $c_{12}$, $c_{13}$ and $c_{14}$ shown in a range "a" of FIG. 7B are displayed on the lower display portion of the display unit 9 (See FIG. 6). Then, the output process is advanced to a step C3, at which the data are read out from the memory area $c_{ij}$ of the data storage unit 63 in the RAM 6 corresponding to the values of "i" and "j" which have been written into the position memories 34 and 35, and simultaneously the display of the corresponding matrix element $c_{ij}$ is inverted. In this case, since "i" and "j=1" have been written into the memory contents of the position memories 34 and 35, the data are read out from the memory area $c_{11}$ of the data storage unit 63, and are displayed on the display unit 9, and furthermore, the display of the corresponding matrix element $c_{11}$ is inverted. This display state is represented in FIG. 6.

Next, when the "→" the key 1l of the key input unit 1 is operated, a judgement result at the step C4 becomes YES and then the output process is advanced to a further step C5. At this step C5, content "j" of the position memory 35 in the control unit 3 is counted up by "j+1". Then, the output process is advanced to a step C6, at which a judgement is made whether or not the memory area $c_{ij}$ exceeds the size of the matrix. If a judgement result is made "NO" because the representations of the matrix elements are within the range of the matrix "C", the output process is returned to the step C3. At this step C3, the data read out from the memory area $c_{12}$ of the data storage unit 63 is displayed on the display unit 9, and also the display of the corresponding matrix element $c_{12}$ is inverted.

Subsequently, when the "→" key 1l is repeatedly operated in the similar manner, the inverted representations of the matrix elements displayed on the display unit 9 are scrolled in the left direction of the display screen, and furthermore the corresponding data is displayed. Thereafter, the memory content of the position memory 35 is counted to "j=8". When the representations of the matrix elements displayed at the display unit 9 is outside the range, a judgement result at a step C6 becomes YES and then the output process is advanced to a step C7.

At the step C7, the memory content "j" of the memory 35 is adjusted. That is, the memory content of the position memory 34 in the control unit 3 is counted up by (i+1) and another memory content of the position memory 35 is set to j=1. Then, the data output process is returned to the previous step C2 in which the matrix elements of $c_{21}$, $c_{22}$, $c_{23}$ and $c_{24}$ shown in the range "b" of the FIG. 7b is represented in the lower display portion of the display unit 9. As a consequence, the data read out from the memory area $c_{21}$ of the data memory unit 63 is displayed in the display unit 9 and then the display of the corresponding matrix element $c_{21}$ is made in the inversion mode.

When the "→" key 1( is repeatedly operated in the similar manner, the display of the matrix elements on the display unit 9 is scrolled along the left direction, and furthermore sequentially line-fed in the lower direction. Then, the data read out from the storage area $c_{ij}$ of the data storage 63 are displayed on the display unit 9, and the display of the corresponding matrix element $c_{ij}$ is made in the inversion mode.

It should be noted that when the "←" key 1k of the key input unit 1 is operated, the key operation thereof is opposited to that by the "→" key 1l. In case that either the " ↓ " key 1j or " ↑ " key 1i is operated, the memory content "i" is increased by 1 or decreased by 1, and the representations of the matrix elements are scrolled along the vertical line of the display screen of the display unit 9. It should also be noted that since this operation is similar to that as defined in the flow chart for explaining the input operation, no further description thereof is made.

As previously explained, since the representations made in accordance with the row-column arrangement of the matrix elements may be established on the display screen, every operator may correctly, visually graspe the positions of the matrix elements, so that data may be surely inputted into the desirable matrix elements.

Furthermore, according to the present invention, since any numerals data other than zero are inputted by operating the "F" keys, and the key operation to enter zero to the matrix element is omitted, the entire data input operation may be simplified.

Moreover, since all of the elements are successively observed by operating the "→" key from the representation of the calculation results, the compact calculator may be easily operated.

What is claimed is:

1. A compact electronic calculator comprising:
   key input means including matrix designation keys for designating a matrix, a numeral entry key for entering values of matrix elements, and a function key for designating one of a plurality of determinant calculations:
   input data storage means having a plurality of matrix storage regions, for storing matrix data values of the matrix elements;
   calculation means for performing a determinant calculation by utilizing the matrix data stored in said input data storage means;
   display means having a first display section for displaying one value of the matrix elements, and a second display section for displaying a plurality of matrix elements;
   input display control means coupled to said display means for displaying a portion of the matrix designated by said matrix designation keys on the second display section;
   selection means for selecting one of the matrix elements displayed on the second display section; and
   data input control means for inputting the value displayed on the first display section, into a memory area of said input data storage means corresponding to one of the matrix elements which has been selected by said selection means.

2. A compact electronic calculator according to claim 1, wherein said selection means includes:
   key input members included in said key input means, and provided in a one-to-one relationship with the matrix elements displayed on the second display section.

3. A compact electronic calculator according to claim 2, wherein said input display control means includes scroll means for scrolling a representation of the matrix elements displayed on the second display section.

4. A compact electronic calculator according to claim 3, wherein said key input means further includes a scroll key, and said scroll means includes means for executing the scrolling process in response to operation of the scroll key.

5. A compact electronic calculator according to claim 3, further comprising mans for designating a range of the matrix.

6. A compact electronic calculator according to claim 5, wherein said input display control means includes:
   judgement means for judging whether or not the representation of the matrix elements is outside the range of the designated matrix when the scroll process is performed; and
   representation limit means for limiting a representation of the matrix elements exceeding the range of the matrix in accordance with a judgement result of the judgement means.

7. A compact electronic calculator according to claim 2, wherein said second display section includes:
   display means for displaying a plurality of row elements along one row of a display screen of said display means.

8. A compact electronic calculator according to claim 1, further comprising:
   output data storage means for storing matrix data obtained by said calculation means;
   output display control means for displaying a portion of elements related to the matrix data which has been stored in said output data storage means, on said second display section; and
   data output control mans for reading out one of the value of the matrix data which has been stored in said output data storage means, so as to display the read value on said first display section.

9. A compact electronic calculator according to claim 8, wherein said key input means includes a scroll key for designating a matrix element.

10. A compact electronic calculator according to claim 9, wherein:
    said output display control means includes display control means for displaying the matrix element designated by the scroll key in a specific representation mode; and
    said data output control means reads out the value related to the matrix element designated by the scroll key in order to display the read value thereon.

11. A compact electronic calculator according to claim 9, wherein said second display section includes:
    display means for displaying a plurality of row elements of the output data matrix along one row of a display screen of said display means.

* * * * *